Nov. 22, 1960 I. L. WIESELMAN ET AL 2,961,482

CRYPTOGRAPHY SYSTEM

Filed Nov. 26, 1956 4 Sheets-Sheet 1

INVENTORS.
IRVING LOUIS WIESELMAN
GEORGE W. BROWN
BY Lyon & Lyon
ATTORNEYS.

INVENTORS.
IRVING LOUIS WIESELMAN
GEORGE W. BROWN
BY Lyon & Lyon
ATTORNEYS.

Nov. 22, 1960 I. L. WIESELMAN ET AL 2,961,482

CRYPTOGRAPHY SYSTEM

Filed Nov. 26, 1956 4 Sheets-Sheet 3

INVENTORS.
IRVING LOUIS WIESELMAN
GEORGE W. BROWN
BY Lyon & Lyon
ATTORNEYS.

INVENTORS.
IRVING LOUIS WIESELMAN
GEORGE W. BROWN
BY Lyon & Lyon
ATTORNEYS.

United States Patent Office 2,961,482

Patented Nov. 22, 1960

2,961,482

CRYPTOGRAPHY SYSTEM

Irving L. Wieselman, Los Angeles, and George W. Brown, Pacific Palisades, Calif., assignors, by mesne assignments, to Paramount Pictures Corporation, New York, N.Y., a corporation of New York Filed Nov. 26, 1956, Ser. No. 624,322

9 Claims. (Cl. 178—5.1)

This invention relates to systems for scrambling broadcast programs and, more particularly, to an improved arrangement for preventing a television broadcast from being intelligibly viewed by unauthorized receivers.

Subscription television is the name applied to a proposed system wherein television programs are transmitted in such a manner that they can only be intelligibly reproduced on the receivers of subscribers to the system. Amongst the systems which have been proposed is one wherein a coded television program is transmitted along with signals indicating its cost and other signals identifying the program. An unauthorized receiver is incapable of reproducing intelligibly the program being transmitted. An authorized receiver has a decoding attachment which may be termed a coinbox for convenience. This coinbox contains the necessary apparatus to enable the intelligible reproduction of the program being received. However, such intelligible reproduction is only permitted to occur after the price of the program which is indicated by the signals being received from the transmitter has been deposited in the coinbox.

Various systems for rendering the program unintelligible at the transmitter and intelligible at the receiver have been proposed. Without going into the merits of these systems, it should be apparent that if subscription television is to be successful, it is necessary that the arrangement for scrambling the program at the transmitter and for unscrambling it at the receiver should be simple, dependable, and economical. A further requirement is that this arrangement should be one which is not easily susceptible of being broken by nonsubscribing individuals.

An object of the present invention is to provide a novel arrangement for encoding a television program.

Another object of the present invention is the provision of an arrangement for encoding a television program which is difficult for unauthorized individuals to decode.

Still another object of the present invention is an arrangement for encoding a television program which is difficult for unauthorized persons to decode and yet which is simple and inexpensive.

Yet another object of the present invention is the provision of a novel arrangement whereby the information for decoding a coded television program is made available to an authorized receiver.

These and other objects of the invention are achieved by modifying a transmitter so that it can transmit the video signal in either of two modes and the audio signal in either of two modes. The one of the two modes which is employed for transmission is dictated by the count condition of a counter at a time designated as the selection time. A frequency burst is transmitted at selection time. The counters are advanced at the transmitter in response to horizontal blanking pulses. However, the counting interval has a randomly occurring starting and stopping interval. A subscriber receiver has appropriate demodulating means for either of the two transmitted modes. It selects the proper one by means of counters at the selecting time in response to the receiver receiving the frequency burst. The counters at the receiver are caused to vary their count conditions in response to horizontal synchronizing signals being applied thereto to advance the count. This occurs, however, during the same random interval as occurs at the transmitter.

To establish this interval, a random number-generating means is provided at the transmitter which is permitted to operate only within vertical blanking-pulse intervals. Means are provided to identify when a first predetermined number is generated. At that time, a gate is enabled in order that the succeeding counters at the transmitter may proceed to count horizontal pulses being applied to this gate. Means are also provided to establish when a second predetermined number is generated by the random number generator. At that time, the gate through which pulses are applied to the counter is closed. The digits generated by the random digit generator are transmitted as frequency bursts at the time of their occurrence. At the receiver, these frequency bursts are received, converted to the appropriate digits and staticized in a shift register so that recognition circuits of the same type as are found in the transmitter may be energized to establish the beginning and the ending of the counting interval.

The audio portion of the television program may also be transmitted in one of two modes. The apparatus just described for selecting the transmitting mode for the video portion of the program is also employed for selecting the transmitting mode for the audio portion of the program. The transmitter and receiver have separate counters for this function which are actuated along with the video-mode-selecting counters.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

In an application by Philip Weiss, for Secrecy System, filed April 18, 1955, Serial No. 501,840, which is assigned to this assignee, there is described an arrangement for switching an audio signal between two transmitting channels in a manner so that switching transients may be eliminated. The principles set forth in that application are employed in the audio system to be described. Transmitting the audio signals on one or the other of two transmitting channels is analogous to transmitting these signals in one or the other of two modes.

To explain the principles set forth in the above-noted Weiss application, consider that an audio signal is being transmitted on a first of two channels. At the time it is desired to perform the switching operation, the level of the audio signal is gradually brought up on the second channel until it is the same as on the first channel. During this time, the switching operation may occur. Thereafter, the audio signal level is brought down to zero on the channel on which it is not desired to continue the transmission.

Figure 1:
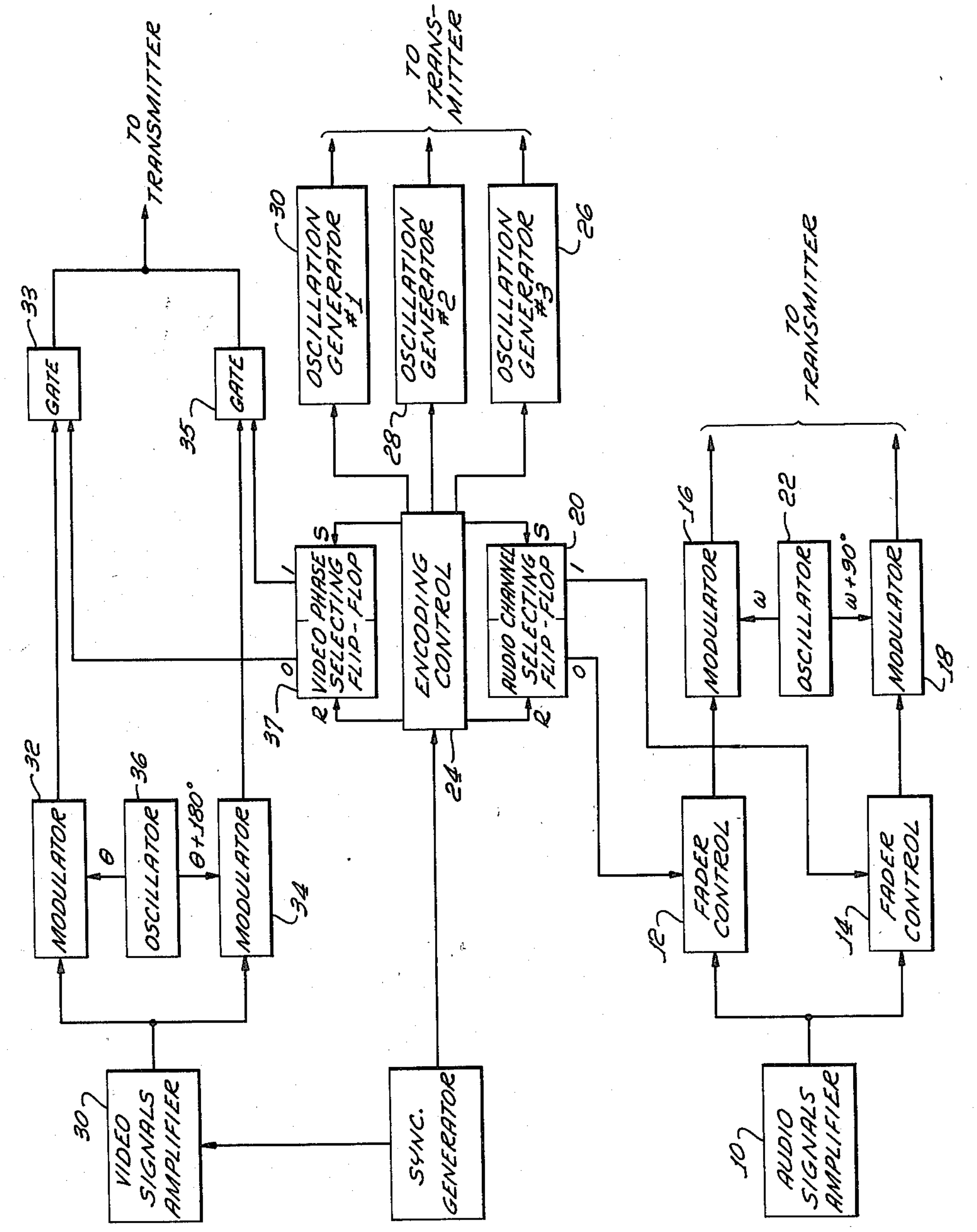
Figure 1 is a block diagram of the structure required for modifying a transmitter to be operative in accordance with this invention.

Reference is now made to Figure 1, which is a block diagram of the apparatus required to modify a transmitter to function in accordance with this invention. A source of audio signals 10 applies its output to two fader controls 12, 14. Fader controls are commercially purchasable manual or motor-driven attenuators which may be operated to bring a signal level from zero up to maximum with a smooth transition. Thus, assume fader control 12 is permitting the signals from the source 10 to be applied to the modulator 16. Fader control 14 is attenuating the signals from the source 10 being applied thereto. An audio channel selecting flip-flop 20 is illustrative of the control-actuating device for these two faders. This flip-flop circuit is the well-known Eccles-Jordan circuit which has two stable conditions and a separate output may be derived in each. It may be driven to one or the other of these two stable conditions, respectively designated as set and reset, by the input applied thereto from the encoding contol 24. In one of these stable conditions, which may be designated as the reset condition, the output which may be designated as "zero," is available. In the other of its stable conditions, which is the set condition, its other output is available. This may be designated as the "one" output. In the assumed example, the "zero" output is high.

Assume it is desired to transfer the mode of transmitting the audio signal, then the "one" output of the audio channel selecting flip-flop is made high. This causes fader control 14 to gradually bring up the level of the audio signal to be applied to the modulator 18. Thereafter, fader control 12 gradually attenuates the amount of audio signal permitted to be applied to modulator 16.

An oscillator 22 generates a subcarrier frequency and provides two outputs. One of these outputs is applied to the modulator 16, and the other of these, in quadrature therewith, is applied to modulator 18. Thus, any audio signal passing through fader control 12 is modulated on the subcarrier and any audio signal passing through fader control 14 is modulated on the quadrature subcarrier.

In order to demodulate the audio signal, the receiver must follow any shift made at the transmitter between the quadrature-related subcarriers. The instructions for shifting between subcarriers are derived from apparatus represented by the rectangle labeled "Encoding control" 24. At the time of the making of this shift, an oscillation generator 26 is energized to emit a frequency burst, which is hereafter designated as the audio-selection signal. This frequency burst is transmitted during the vertical blanking interval, as will be hereafter explained in more detail. This burst is detected at the receiver and instructs the receiver to demodulate the incoming audio signal with he properly phased subcarrier, so that it can be intelligibly reproduced. It should be noted here that although only one audio signal source 10 is represented as being transmitted in one or the other of the two transmission modes, the system described admits of two signals to be transmitted, one in one mode when the other is in the other mode and these modes may be interchanged when switching occurs. The paid-up receiver may be instructed by the selecting signal to demodulate the subcarrier to follow the program signal, while the unpaid receiver follows the other of the two subcarrier signals. This arrangement, too, is described in the previously noted application to Philip Weiss. However, in the present application, for the purpose of simplifying the explanation of the invention, it will be assumed that only one audio signal source is employed to be transmitted.

A source of video signals 30, which, as is well known, may be the television camera and its associated equipment, also applies these signals to two modulators 32 and 34. An oscillator 36 supplies as output two subcarrier signals having the same frequency, but with one of these being displaced in phase 180° from the other. The output of the respective modulators 32, 34 are applied to two gates 33, 35. These gates are of the well-known type which require a second signal as an enabling input before they can provide any output. These second inputs for the respective gates 33, 35 are derived from a video phase selecting flip-flop circuit 37. This is identical with the audio channel selecting flip-flop, and its "one" output enables gate 38 and its "zero" output enables gate 35. Flip-flop 37 is controlled in accordance with the instructions received from the encoding control circuit 24.

Thus, the transmitter will send the video signals modulated on one or the other of two out-of-phase subcarriers. The unauthorized receiver will see a video picture which is either phase-reversed or in proper phase. These phase reversals occur in a random fashion, and thus the picture is not usable and is extremely irritating to watch.

At the time the encoding control 24 instructs the video phase selecting flip-flop to switch, the phase of the carrier upon which the video signals are modulated, an oscillation generator 28 is instructed to emit a burst of oscillations. This oscillation burst is designated hereafter as the video selecting signal. It instructs the receiver, a subscriber receiver, to switch the phase of the demodulating carrier being applied to the received video signals. In this manner, the receiver is instructed as to the proper time at which to make the change. A third oscillation generator 30 is instructed by the encoding control 24 to emit bursts of oscillations which carry information to the receiver, whereby the receiver may select the proper video and audio demodulating carriers to achieve intelligible reproduction. The selecting signals which are derived from the oscillation generators 28 and 26 instruct the receiver as to the time at which the selection is to be made. All the information for instructing the receiver on how to render the transmission intelligible is transmitted during the vertical blanking interval. In this manner, it does not interfere with any of the other television signals being transmitted. A detailed description of these briefly described video and audio encoding systems at both the transmitter and receiver is given in Patent No. 2,875,270, to Wendt et al.

Figure 2:
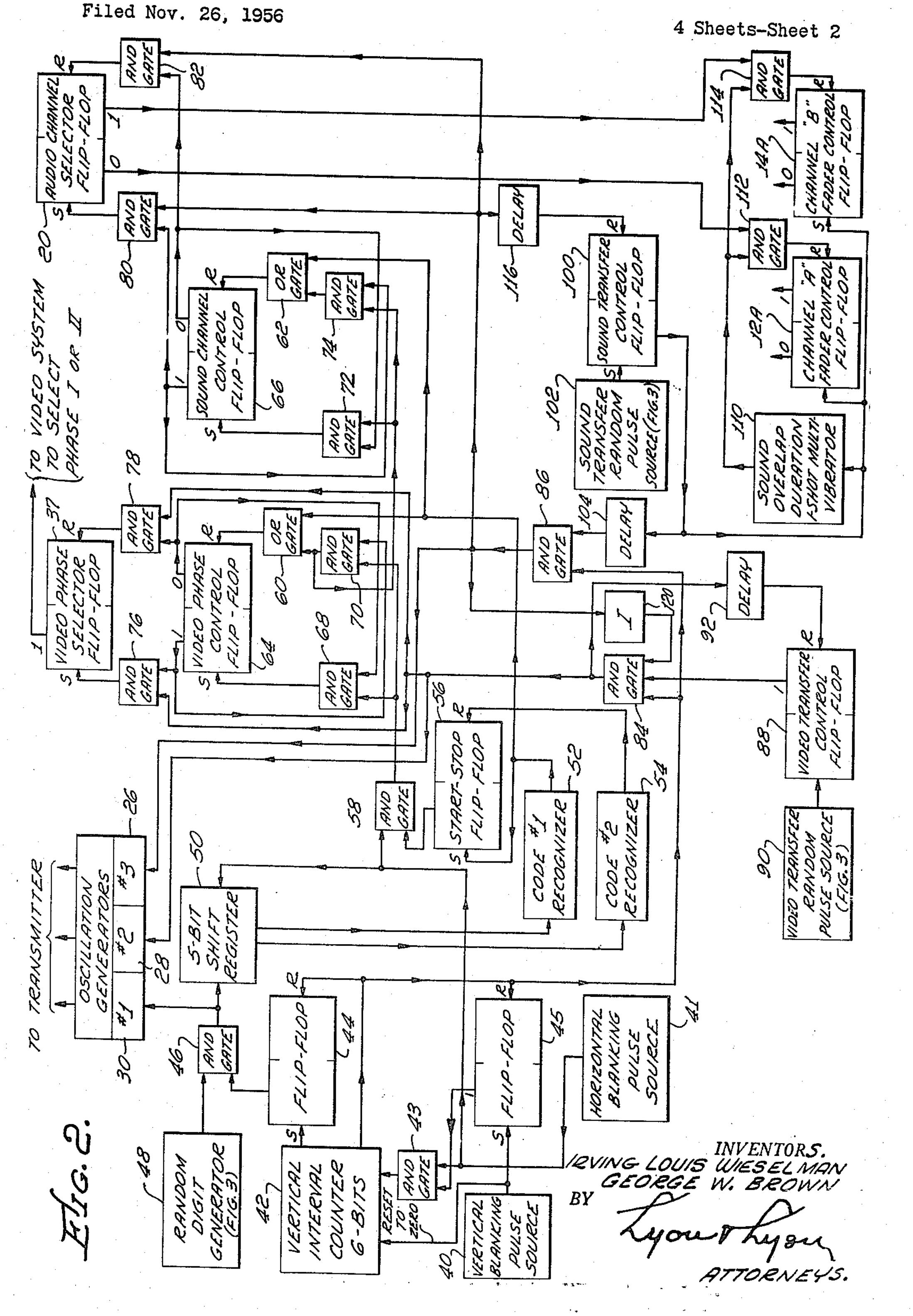
Figure 2 is a block diagram of this embodiment of the invention which is located at a transmitter.

Reference is now made to Figure 2, which shows a block diagram of an embodiment of the invention. Figure 2 exemplifies the circuitry which is required for the block labeled "Encoding control" 24 in Figure 1. The vertical blanking pulse source 40 is the one regularly employed in the transmitter. Its output, which occurs at the beginning of the vertical blanking interval, is applied to reset to the zero count condition a vertical interval counter 42. This counter is the well-known binary, or decimal, type of pulse counter, which should have a capacity to count to at least 20. The vertical blanking pulse not only resets the counter, but also enables it to start to count horizontal blanking pulses which are applied from the horizontal blanking pulse source 41 to the counter 42 through an AND gate 43. The AND gate is enabled by a flip-flop 45 which is driven to its set condition by the vertical blanking pulse; when the counter has reached its full count of 20 then the counter output is applied to reset the flip-flop 45, and thus AND gate 43 is no longer enabled.

The counter will advance one count for each horizontal blanking pulse. When the counter has advanced to the sixth count, this is sensed and the output is employed to set a flip-flop circuit 44. This flip-flop circuit has one of its outputs (the one which is enabled when it is in its set condition) applied to a register gate 46. When the counter 42 has counted to the count of 20, it resets the flip-flop circuit 44, whereby the register gate 46 is no longer enabled. Therefore, the register gate 46 will remain open for the duration of 14 lines.

A random-digit generator 48 generates digits randomly. The structure for the random-digit generator 48 is shown in more detail in Figure 3. The output of the random-digit generator is applied to the register gate 46, and the gate output, when enabled, is applied to a shift register 50. For the purposes of description, this shift register may be a five-bit shift register, or one that holds five binary digits. Pulses to advance the contents of the shift register are provided by the horizontal blanking pulse source 41. The shift register is a well-known arrangement of circuitry wherein ones and zeros which are applied to its input are transferred from stage to stage, thus passing through and, if desired, out of the shift register. A suitable shift register circuit is found described in the article in Electronics magazine for November 1949, entitled Gate Type Shifting Register, pp. 181–184, by Stevens and Knapton. It will therefore be seen that for the duration of 14 lines within the vertical blanking interval, the shift register 50 receives randomly generated ones and zeros from the random-digit generator. Each time a one occurs, the output of the register gate is also applied to energize an oscillation generator 30 (shown in Figure 1) to provide as an output a burst of oscillations.

The contents of the shift register 50 are continuously being scanned by two code-recognizer circuits, respectively designated as code No. 1 recognizer 52 and code No. 2 recognizer 54. These both comprise circuitry which may be set to provide an output only when the code number which is previously set into them is identified as existing in the five-bit shift register. A suitable code-recognition circuit may be found described and shown in a patent to Ayres and Smith, No. 2,648,829, entitled Code Recognition Circuit. When the code No. 1 recognizer functions, its output is applied to set a flip-flop circuit 56, which is designated as the start-stop flip-flop. Output from the code No. 2 recognizer is employed to reset the start-stop flip-flop circuit.

A counter-input gate 58 is enabled when the start-stop flip-flop circuit is set and is disenabled when the start-stop flip-flop circuit is reset. Thus, whenever the code No. 1 recognizer emits an output, the counter gate 58 passes horizontal blanking pulses to the succeeding apparatus. The time at which counter gate 58 is enabled—indicating the beginning of a counting interval—has a random occurrence. Likewise, the end of this counting interval, which occurs when an output from code No. 2 recognizer is received, has a random occurrence. It should be noted that the extent of the random interval can occur over several fields and is not necessarily restricted to a single field.

The output of the code No. 1 recognizer is also applied to two OR gates 60, 62. The output of these respective OR gates is respectively applied to reset two flip-flop circuits 64, 66. One of these flip-flop circuits is designated as the video-phase-control flip-flop 64 and the other is designated as the sound-channel-control flip-flop 66. These flip-flop circuits may be effectively considered as two binary-digit counters. When the video-phase control flip-flop circuit is reset, then an AND gate 68 is enabled by the output from the zero side of the flip-flop circuit. It may thus apply a horizontal blanking pulse to the flip-flop circuit to establish it in its set condition. This will cause the "one" side of the flip-flop to provide output, whereby the AND gate 70 is enabled to apply the next horizontal blanking pulse to the video-phase-control flip-flop to reset it. Thus this flip-flop is driven between its set and reset conditions by successive pulses from the horizontal blanking pulse source.

The output of the AND gate 70 is also applied to two AND gates 72 and 74. When the sound channel control flip-flop 66 is reset, then its zero output is high and AND gate 72 is enabled to apply the output received from AND gate 70 to the control flip-flop to establish it in its set condition. The set output of the sound-channel-control flip-flop enables AND gate 74 so that the next pulse received from the horizontal blanking pulse source via AND gate 70 is applied to AND gate 74 to reset the sound-channel-control flip-flop. Thus, these two counters are driven in the manner of two stages of a binary counter for as long as the counter input gate 58 remains open.

The outputs of the video-phase-control flip-flop are coupled to two other AND gates 76, 78. These are connected to the video-phase-selecting flip-flop 42 shown in Figure 1. At some random time, which is established in a manner to be described, the condition of the video-phase-control flip-flop is transferred through these AND gates to the video-phase-selecting flip-flop 37. The video-phase-selecting flip-flop then operates the gates 33 and 35 in the manner previously described, to select the indicated mode of transmisison. Similarly, two AND gates 80, 82, which are coupled to the outputs of the sound-channel-control flip-flop 66 at some random time are energized to transfer their count condition into the audio-selecting flip-flop 20 shown in Figure 1, which then operates the fader controls in the manner previously described to select the audio transmission mode.

Figure 3:
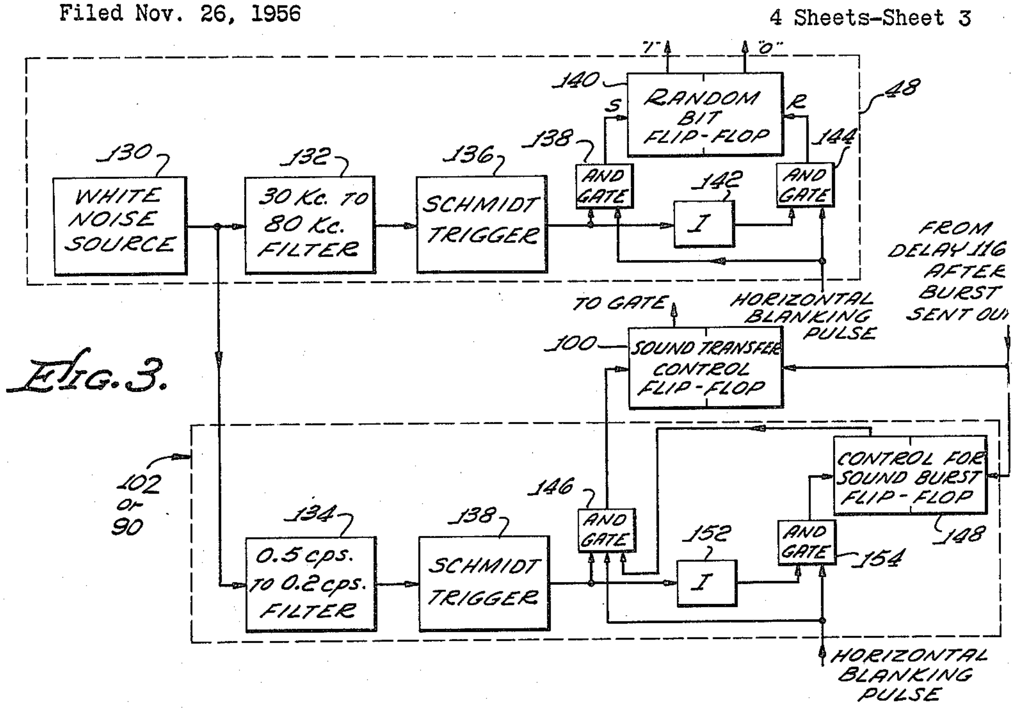
Figure 3 is a block diagram of suitable random digit and random pulse generators which may be employed in the embodiment of the invention.

Referring again to Figure 2, it will be seen that the output of the vertical interval counter 42, at the count of 20, is also applied to an AND gate 84 and to AND gate 86. The second required input to the AND gate 84 is derived from the one output of a video-transfer-control flip-flop 88. This flip-flop is driven to be set by the output of apparatus designated as "Video-transfer random pulse source 90," This structure is also shown in Figure 3. At some random time, this video-transfer pulse emits a pulse which drives the video-transfer-control flip-flop into its set condition. This flip-flop will remain set until such time as a pulse is received from the output of AND gate 84 through a delay line 92. It is then reset. The output of AND gate 84, which, if it occurs, can only occur when the vertical interval counter 42 reaches the count of 20, is applied to the oscillation generator 28 to enable it to provide a burst of oscillations at a predetermined frequency, signifying the occurence of the video-transmitting-mode selecting time. At the time this oscillation burst occurs, the output of AND gate 84 is also applied to enable the two AND gates 76 and 78. However, only one of them will have an output, since although the video-phase-control flip-flop has both of its outputs coupled to these AND gates, it will be in either its set or reset condition at the time. One of these two will operate on the following video-phase-selecting flip-flop 37 to establish it in the same condition as the video-phase-control flip-flop 64.

To summarize the operation of the system as already described, a vertical interval counter is energized at the time that a vertical blanking pulse occurs. The vertical interval counter has its count advanced in response to horizontal blanking pulses. Six pulses after the counter is energized, it provides a first output which enables apparatus which can be considered as a random number generating apparatus to provide random numbers. The random number generating apparatus ' cludes the random digit flip-flop which opens the AND gate 46. The output of the random digit generator 48 is provided through this AND gate 46 to a five-bit shift register. The shift register is advanced in response to horizontal blanking pulses. Thus, the numbers which are established in the shift register may be considered as randomly established numbers. At the count of 20 by the vertical interval counter, the gate 46 is disenabled, whereby no more pulses are applied to the shift register.

Simultaneously with the input of ones to the shift register, frequency bursts are generated which are transmitted. These frequency bursts occur every time a "one"

digit occurs. The numbers in the five-bit shift register are recognized by a first code recognizer, which initiates succeeding counters by enabling the AND gate 58 to pass horizontal blanking pulses to cause two succeeding two-bit counters to count. When a second predetermined number is established in the register, a second code recognizer recognizes this and operates to close the gate 58, whereby the video-phase-control flip-flop, which is one of the two-bit counters, discontinues counting.

At a time which occurs at the count of 20, the vertical interval counter provides an output which enables the condition of the video-phase-control flip-flop to be transferred and to establish the one of the two transmitting modes which is associated with the condition of the video-phase-control flip-flop at the time its operation was stopped. However, this transfer of condition occurs only if a random-pulse generator 90 had provided a random pulse prior to the count of 20 or at the time of its occurrence to the video-transfer-control flip-flop.

The description that has preceded applies to the encoding of the video signal. The sound signal also is encoded. In effect, the sound signal is handled in parallel with the video signal. The sound channel control flip-flop 66, as was described previously, is a second two-bit counter. It has its count condition advanced in response to horizontal blanking pulses when the AND gates 58 and 70 are enabled.

Upon the count of 20 by the vertical interval counter, a signal is provided by an AND gate 86. This AND gate, in order to be enabled, requires an output from a sound-transfer-control flip-flop 100. The sound-transfer-control flip-flop 100 is set by an output from a sound-transfer random-pulse generator 102. The sound-transfer-control flip-flop output is applied to AND gate 86 through a delay line 104.

The output of AND gate 86 enables AND gates 80 and 82 so that the audio-channel-selecting flip-flop 20 may be placed in the same condition as sound-channel-control flip-flop 66. AND gate 86 output also is applied to oscillation generator 26 to enable it to emit a burst of oscillations. Finally, AND gate 26 output is applied to inverter 120 to insure that AND gate 84 is disenabled when AND gate 84 provides an output. This is done to insure that video and audio selecting signals do not occur simultaneously and in the same field. It also gives the audio selecting signals a priority.

The output of the sound-transfer-control flip-flop 100 is applied to a one-shot multivibrator 110 called the sound-overlap-duration one-shot multivibrator. It is also applied to the set inputs of a channel A fader-control flip-flop 12A and of a channel B fader-control flip-flop 14A. These flip-flops are included in the respective fader-control circuits 12 and 14 in Figure 1 and serve the function of controlling, for example, motors (not shown), which in turn vary attenuators in the respective channels. From a previous operation one of the fader-control flip-flops was set and the other reset. When either of these flip-flops is set, its "one" output controls the attenuator in the channel to allow audio signals to be applied to the succeeding modulator, the "zero," or reset output, from a flip-flop controls the channel-attenuator to block audio signals from that channel. The sound-transfer-control flip-flop output thus sets the one of the two fader-control flip-flops not already set, thus bringing up the audio signals on both channels. The one-shot multivibrator 110 serves the function of providing an interval during which the same sound is being transmitted over both channels. The one-shot multivibrator is tripped from a stable to an unstable condition by the output from the sound-transfer-control flip-flop 100. It returns to its stable condition at the end of an interval determined in well-known manner by the values selected for the circuit components. At this time, it provides an output pulse which is applied to two AND gates 112, 114. These AND gates are both thus simultaneously enabled. Their outputs are respectively applied to the reset inputs of flip-flops 12A and 14A. However, only one of them provides an output at that time. This is determined by the condition of the audio-channel-selector flip-flop, since the other required inputs of the AND gates 112 and 114 are respectively derived from the zero and one outputs of the audio-channel-selecting flip-flop 20. Thus, only one of the two fader-control flip-flops is reset at the end of the overlap interval in accordance with the condition of the two-bit counter 66 at the time of the selecting pulse output from AND gate 86. As described, the fader-control flip-flop which is reset proceeds to control its attenuator to reduce the audio signals being applied to the channel to zero.

It can now be seen that both the video and the sound signals are encoded and the information for decoding is transmitted in the form of three oscillation bursts which occur during the latter part of the vertical blanking interval. These oscillation burst signals provide code-number information and sound-and-video-selecting-interval information. In an embodiment of the invention which was built these frequency bursts were 3.2 megacycles for the code digits, 2.7 megacycles for the audio selection signal, and 2.2 megacycles for the video selection signal. These bursts are transmitted during the normal blanking interval, have a duration on the order of 53 microseconds, which is the length of a normal line of video. They are inserted on the carrier during the blanking interval with a D.C. level at the normal blanking level and the A.C. component modulated thereon.

Reference is now made to Figure 3, which shows a block diagram of the random digit generator 48 and the random pulse generators employed in the embodiment of the invention. A rectangle designated as a white-noise source 130 may be any well-known type, such as a gas tube which has operating potential applied thereto and has its grid left unconnected. Output from the white-noise source is applied to two filters. One of these is a 30 to 80 kc. bandpass filter 132 and the second is a one-half cycle to a two-tenths cycle bandpass filter 134. The outputs from both of these filters are wave shapes having a somewhat sine waveform and varying within the frequencies of the band widths of the filters. The output of the filter 132 is applied to a Schmitt trigger circuit 136; the output of the filter 134 is applied to a Schmitt trigger circuit 138. The Schmitt trigger circuit is a well-known form of flip-flop circuit which assumes one stable condition in the presence of a voltage which exceeds a predetermined level, and when the voltage applied thereto is less than this predetermined level, the Schmitt trigger circuit returns to its initial stable condition. The Schmitt trigger circuits 136 and 138 have a bias applied thereto to establish the triggering level at any voltage which is positive and exceeds the zero-voltage level. Thus, any time that the output of the bandpass filters 132 and 134 exceed the zero level, the Schmitt trigger circuits which follow these filters will provide an output to the succeeding circuitry.

The output of the Schmitt trigger 136 is applied to an AND gate 138. The second required input to this AND gate consists of horizontal blanking pulses. Thus, if the Schmitt trigger circuit 136 is providing an output the next time that the horizontal blanking pulse occurs, the AND gate 138 will set the random-bit flip-flop 140. However, when the Schmitt trigger circuit 136 does not provide an output, then an inverter circuit 142 provides an enabling output to AND gate 144. Upon the occurrence of the next horizontal blanking pulse, the random-bit flip-flop 140 is reset. The arrangement enclosed in the dotted lines is used for the random digit generator 48. The remainder of the circuit shown in Figure 3 may be used for the sound transfer random pulse source 102 and the video transfer random source 90.

The output of Schmitt trigger circuit 138 is applied to an AND gate 146. This AND gate has a second required input horizontal blanking pulse. A third required condition for enabling this AND gate is that the sound-burst-control flip-flop 148 be in its set condition. The output of AND gate 146 is applied to the set input of the sound-transfer-control flip-flop 100. The output of this flip-flop is applied to the succeeding gate 86 to cause it to be enabled. After a burst of oscillations is sent out, the sound-transfer-control flip-flop 100 is reset. When the Schmitt trigger 138 does not provide an output, then the inverter 152 provides an enabling input to AND gate 154. Upon the occurrence of the next horizontal blanking pulse, this AND gate provides an output to the set input of the control for sound burst flip-flop 148. This enables AND gate 146 to be subsequently enabled. Flip-flop 148 is also reset after an oscillation burst has been sent out. Thus an immediate operation thereafter of the sound-transfer-control flip-flop is prevented.

Figure 4:
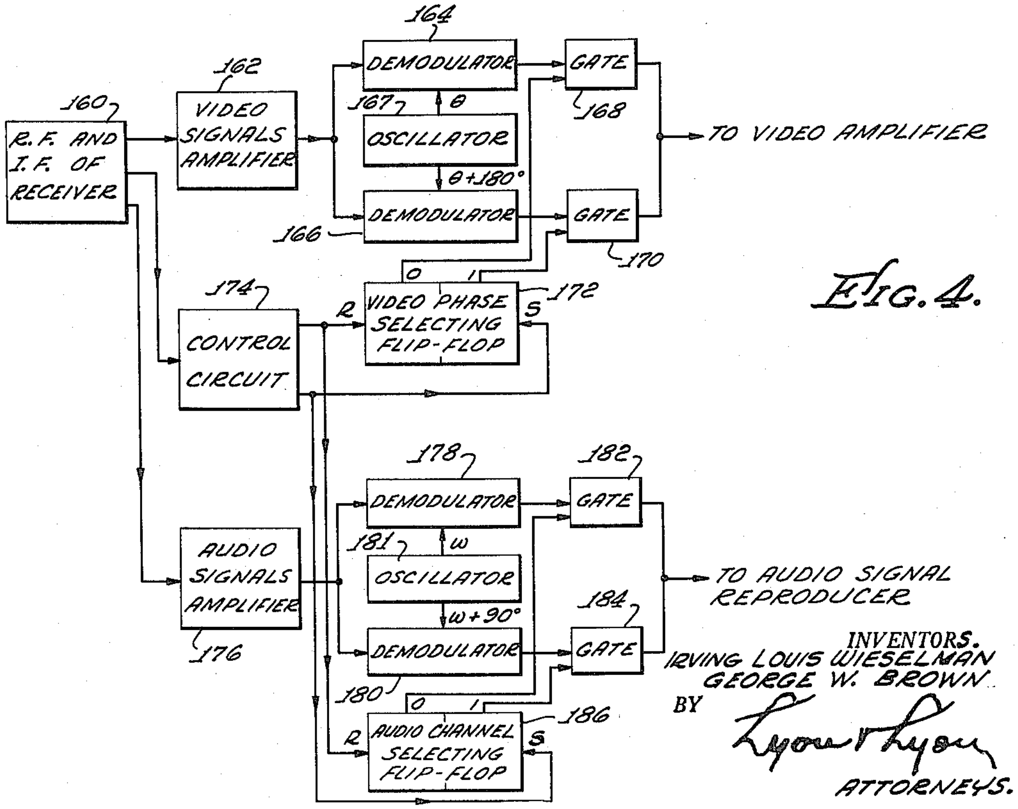
Figure 4 is a block diagram showing the additional apparatus required for modifying a receiver to decode the signals received from the transmitter.

Reference is now made to Figure 4, which is a block diagram of a receiver for utilizing signals of the type described as transmitted. The RF and IF front end 160 of the subscriber receiver is the same as is known and employed in present-day television receivers. The received signals are separated by the traps in the intermediate frequency portion of the receiver into video signals and audio signals. The video signals are amplified in a video signal amplifier 162 and are applied to two demodulators 164 and 166. An oscillator 167 provides to the two demodulators the two required subcarriers, one of these being 180° out of phase with the other. The outputs of the two demodulators 164, 166 are respectively applied to two gates 168 and 170. The one of these two gates which is enabled whereby output may be applied to the succeeding video amplifier is determined by the video-phase-selecting flip-flop 172. Control circuit 174 determines the condition of the video-phase-selecting flip-flop.

The audio signals from the receiver front end are applied to the audio signal amplifier 176. Its output is applied to two demodulators 178 and 180. The two demodulators also have respectively applied thereto two subcarriers, one of which is in quadrature with the other. The output of the two demodulators is applied to two gates 182, 184. The gates are controlled in accordance with the output of an audio-phase-selecting flip-flop circuit 186. This flip-flop circuit receives control signals from the control circuit 174 to establish which one of the two gates 182, 184 is opened.

Figure 5:
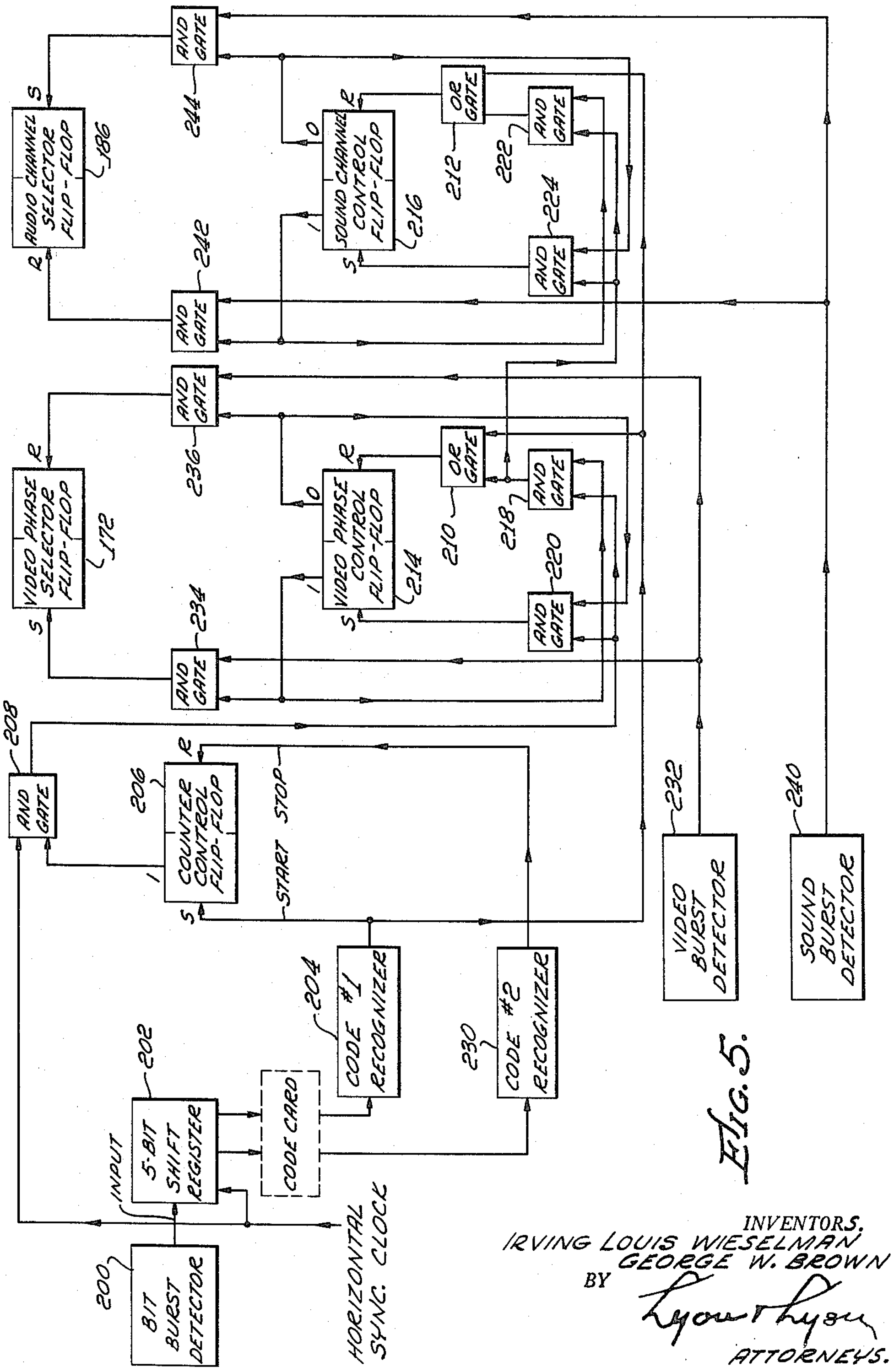
Figure 5 is a block diagram showing an embodiment of the invention which is located at the receiver.

Reference is now made to Figure 5, which shows a block diagram of the details of the control circuit 174 employed in the receiver. The three oscillation bursts which are at three different frequencies and which are transmitted during the vertical blanking interval are detected by respective detectors 200, 232, and 240. The oscillation bursts carrying code significance are detected by a bit-burst detector 200, which is merely a filter which passes only the frequency by which the binary digit one is represented. The output of this bit-burst detector is applied to a five-binary-digit shift register 202, which is substantially identical with the one employed in the transmitter. The shift register is shifted by pulses derived from the horizontal sync pulse source of the receiver.

The contents of the five-bit shift register 202 are detected by a first code recognizer circuit 204, similar to the one in the transmitter, which has set therein the same first number as is set into the first code recognizer in the transmitter. The output of this receiver first code recognizer is applied to set a counter-control flip-flop 206 to provide an output to an AND gate 208. Horizontal sync pulses are also applied to this AND gate, and, when it is enabled, these sync pulses are applied through the AND gate 208 to succeeding counters. These are identical to the two-bit counters previously described in the transmitter.

The apparatus just described thus serves the function of starting these binary counters substantially simultaneously with the counters of the transmitter which is when the code No. 1 recognizer functions. Since the horizontal sync pulses occur in the receiver in synchronism with the horizontal blanking pulses at the transmitter, the counters at the receiver will advance in synchronism with those at the transmitter.

The output of the first code number recognizer is also applied to reset a video-phase-control flip-flop 214 and a sound-channel-control flip-flop 216 via two OR gates 210 and 212. This further insures that the two flip-flop stages 214 and 216, which comprise the receiver counters, are initiated simultaneously with the counters in the transmitter. The output of AND gate 208 is applied to AND gates 218 and 220. AND gate 218 is enabled by the zero, or reset, output of the video-phase-control flip-flop 214, and therefore its output is applied through the OR gate 210 to set the video-phase-control flip-flop. When this occurs, then AND gate 200 is enabled, at which time it may provide a resetting output to the video-phase-control flip-flop.

Two AND gates 222 and 224 enable the successive drive of the sound-channel-control flip-flop 216 similarly to the one corresponding flip-flop in the transmitter in response to output from AND gate 218. This output is applied to both AND gates 222 and 224. AND gate 222 is enabled when the sound-channel-control flip-flop is in its reset condition, and AND gate 224 is enabled when the sound-channel-control flip-flop is in its set condition.

The advance, or continued counting, of these two counter stages is stopped when the second code number is recognized by a second code number recognizer 230 similar to the one in the transmitter. The output of the second code number recognizer resets the counter control flip-flop, thus disenabling AND gate 208.

The oscillation burst representing the video-selecting signal is detected by the video-burst detector 232. The video-selecting signal resulting enables the two AND gates 234 and 236, which at that time transfer the count condition of the video-phase-control flip-flop into the video-phase-selector flip-flop 172 (shown in Figure 4 also). The sound-burst detector 240 detects the audio-selecting signal. When this occurs, it enables AND gates 242 and 244 to transfer the condition of the sound-control flip-flop 216 into the audio-channel-selecting flip-flop 186.

It may thus be seen that the bit-burst detector enables the shift register to be advanced and to staticize therein the respective first and second numbers, which serve to initiate for a random interval the count advance of the counter comprised by the video-phase-control flip-flop and the sound-channel-control flip-flop. At some time near the end of the vertical blanking interval, the video-burst detector detects the video-selecting signal. This enables the transfer of the count condition of the counter to the remaining circuits in the receiver to shift in phase with the shift at the transmitter to properly demodulate the video signals being received. Either in a previous or in a later field, but not in the same field, the sound-burst detector detects the audio-selecting signal and enables the audio portion of the receiver to be shifted to coordinate with the shift at the transmitter whereby the audio portion of the program is maintained intelligible.

For the purpose of utilization in a subscription television system, provision for changing the code numbers in the code number recognizers at the receivers when required may be made by using a card wrapped around a drum. The card has perforations in a code arrangement. Feeler switches are used to sense these perforations. The drum may be rotated to present different code numbers, either in response to stepping pulses from the transmitter or may be manually set at the receiver when collection of money is made periodically from the coinbox. The decoding operation itself may be actuated upon payment of a proper amount of money into the coinbox. Thus, a further insurance of secrecy is provided by changing the code numbers to be recognized at intervals.

Accordingly, there has been described and shown hereinabove a novel, useful, and inexpensive arrangement for transmitting video and audio signals in d fferent transmitting modes, which modes are selected in a manner to provide secrecy. Furthermore, means are provided for transmitting the information whereby these transmitting modes may be detected and demodulated at receivers of author zed subscribers to the system.

We claim:

1. A system for encoding signals comprising a transmitter having a plurality of transmitting modes, a counter providing a different count output for each different count, normally inoperative means for selecting a different one of said transmitting modes responsive to a different count output, means for generating random numbers, means, to which the output from said means for generating random numbers is applied, to recognize a first predetermined number generated by said random number means and to provide a first output indicative thereof, normally inoperative means to apply pulses to said counter to be counted, means to render operative said normally inoperative means to apply pulses responsive to said first output, means to which output from said means for generating random numbers is applied for recognizing a second predetermined number generated by said random number means and to provide a second output indicative thereof, means responsive to said second output to render inoperative said normally inoperative means to apply pulses to said counter, random pulse generating means, means to establish predetermined intervals of operation of said means for generating random numbers and to emit a terminal signal indicative thereof, and means to which a terminal signal and a random pulse from said generating means is applied for activating said normally inoperative means for selecting a different one of said transmitting modes to obtain transmission of said signals over the one of said transmitting modes selected by the count of said counter at that time.

2. In a system wherein for the purpose of secrecy there is transmitted an intelligence signal in one of a plurality of transmitting modes which is varied, and there are transmitted periodic pulse signals, first code signals indicative of the commencement of the period of selection of a transmitting mode, second code signals indicative of the termination of the period of selection of a transmitting mode, and selection signals indicative of the time of selection of a transmitting mode; a receiver for said signals including a counter providing a different count output signal for each different one of its count conditions, a plurality of demodulating means each of which demodulates the intelligence signals transmitted in a different one of said transmitting modes, a plurality of closed gates, a different one of said gates coupling the output of a different one of said demodulating means to the remainder of said receiver, normally inoperative means for applying each different count of said counter to a different one of said closed gates to open said gate, means for receiving said first code signals, means to apply received periodic pulse signals to said counter responsive to receiving a first code signal, means to stop application of periodic pulse signals to said counter responsive to receiving a second code signal, and means to apply a received selection signal to render operative said normally inoperative means for applying each different count of said counter to a different one of said closed gates to provide the demodulation of said intelligence signal by said receiver with the one of said means to demodulate coupled to the gate opened by the count output signal of said counter at that time.

3. A coded intelligence signal transmission and receiving system, said transmission system comprising a first random digit generator, a shift register, an input gate coupling the output of said first generator with the input to said shift register, means to open said input gate for a predetermined time interval, means to transmit first signals representative of digits passing through said input gate, a pulse source, means to apply pulses from said source to shift the contents of said register, means to transmit pulses from said source, first means to sense the presence of a first predetermined code number in said shift register and to provide a first output indicative thereof, second means to sense the presence of a second predetermined code number in said shift register and to provide a second output indicative thereof, a counter, means for transmitting a signal in a plurality of different transmitting modes each of which is associated with a different count condition of said counter, a counter gate coupling said source of pulses to the input to said counter, means to open said counter gate responsive to said first output, means to close said counter gate responsive to said second output, a random pulse generator, means responsive to a random pulse and the closing of said input gate to order the transmission of said intelligence signals in the one of said plurality of transmission modes associated with the count of said counter, and means responsive to a random pulse and the closing of said input gate to transmit a second signal; said receiving system comprising means to receive said first and second and intelligence signals and said pulses from said pulse source, a shift register, means to apply said first signals to said shift register, means to apply received pulses from said pulse source to said register to shift its contents, a third means to sense the presence of said first predetermined number in said shift register and to provide an output indicative thereof, a fourth means to sense the presence of said second predetermined number in said shaft register and to provide an output indicative thereof, a receiver counter, a plurality of demodu'ating means each of which demodulates the intelligence signals transmitted in a different one of said transmitter modes, each of said demodulating means being associated with a different count of said counter, gate means for applying said received pulses from said source to said counter, means for opening said gate means responsive to output from said third sensing means, means for closing said gate means responsive to output from said fourth sensing means, and means responsive to said second signals to order the demodulation of said intelligence signals by the one of said means to demodulate associated with the count of said counter at the time.

4. A system for encoding signals comprising a television transmitter having a plurality of different means for modulating said signals to have different transmitting modes, a source of vertical blanking pulses, a source of horizontal blanking pulses, a counter producing a different count signal for each different count condition, a plurality of closed gates each of which couples a different one of said means for modulating said signals to the remainder of said system, normally inoperative means for applying each different count of said counter to a different one of said gates for sequentially opening said gates, means for generating random numbers, means for energizing said random number generating means for a predetermined interval, a first means to sense a first code number generated by said random number generator and to provide a first output indicative thereof, means for applying pulses from said horizontal blanking source to said counter responsive to said first output, means to sense a second number generated by said random number generator and to provide a second output indicative thereof, means to stop the application of pulses to said counter by said means for applying pulses responsive to said second output, a random pulse generator, and means responsive to the termination of said predetermined interval and the occurrence of an output from said random pulse generator to render operative said normally inoperative means whereby said system receives said signals in the one of said signal transmitting modes as determined by the gate opened by the count output of said counter at that time.

5. A system as recited in claim 4 wherein said means for generating random numbers includes a random digit generator, a shift register, a gate coupling the output of said random digit generator to said shift register, and means to apply horizontal blanking pulses from said source to said shift register to shift the contents thereof, said means for energizing said random number generating means for a predetermined interval during vertical blanking includes a vertical interval counter, means to enable said counter responsive to a vertical blanking pulse, means for applying horizontal blanking pulses from said source to said vertical interval counter to be counted, means to enable said gate responsive to said counter attaining a first predetermined count, and means to disenable said gate responsive to said counter attaining a second predetermined count.

6. A television transmission system for transmitting encoded signals comprising a television transmitter having a means to transmit video signals in either of two modes, a means to transmit audio signals in either of two modes, a first counter, a second counter, an inoperative first means to derive for transmission a different one of said video signal transmitting modes responsive to a different count of said first counter, an inoperative second means to derive for transmission a different one of said audio signal transmitting modes responsive to different counts of said second counter, a source of horizontal blanking pulses, means to apply pulses from said source to said first and second counters during the vertical blanking interval to advance their count, and means associated with each counter for rendering operative said inoperative first and second means during the vertical blanking interval for deriving an audio and video transmission mode in accordance with the count conditions of said first and second counters, each said first and second means including a random pulse source, a flip-flop circuit coupled to said source, said flip-flop circuit having a first stable condition to which it is driven responsive to receiving a random pulse from said source and a second stable condition, a gate, means for enabling said gate at a predetermined time within said vertical blanking interval, means to apply output from said flip-flop to said gate when in said first stable condition, means to generate a transfer signal responsive to output from said gate, means to reset said flip-flop circuit to its second stable condition responsive to output from said gate and means to store the count condition of the counter responsive to output from said gate.

7. A television transmission system as recited in claim 6 wherein said means to apply pulses from said source to said first and second counters during the vertical blanking interval to advance their count includes a vertical interval counter, means to enable said counter during the vertical blanking interval, means to apply pulses to said vertical interval counter from said horizontal blanking pulse source, a shift register, a random digit generator, a register gate coupling output from said random digit generator to said shift register, means to enable said register gate responsive to said counter attaining a first predetermined count, means to disenable said register when said counter attains a second predetermined count, means to apply pulses from said horizontal blanking pulse source to said shift register to shift the contents thereof, means to generate a code signal responsive to output from said register input gate, means to recognize a first predetermined number in said shift register, a counter input gate coupling said source of horizontal blanking pulses to said first and second counters, means to enable said counter input gate repsonsive to recognition of said first number, means to recognize a second predetermined number in said shift register, and means to disenable said counter input gate responsive to recognition of said second number.

8. In a coded television transmission system wherein there are respectively transmitted audio and video signals in either of two transmitting modes, code signals, and transfer signals indicative of the time of mode selection, a receiver for utilizing said signals said receiver comprising a shift register, means to enter said code signals into said shift register, a source of horizontal synchronizing pulses, means to apply said horizontal synchronizing pulses to said shift register to shift the contents thereof, means to recognize a first predetermined number in said shift register, means to recognize a second predetermined number in said shift register, a first counter, a second counter, means to apply horizontal synchronizing pulses from said source to said first and second counters responsive to recognition of said first number, means to stop application of pulses to said counters responsive to recognition of said second number, a separate means to demodulate for each transmitted mode of said video signals each of which is associated with a different count condition of said first counter, a separate means to demodulate for each transmitted mode of said audio signals each of which is associated with a different count condition of said second counter, and means responsive to said transfer signal to apply said received audio and video signals to the one of the respective means to demodulate which is associated with the count conditions of said first and second counters at the time said transfer signals are received.

9. A system for encoding a signal for transmission comprising a plurality of different channels to which said signal is applied, each of which includes means for modifying said signal in a different transmitting mode, a first random digit generator, a shift register, means to enter digits from said random digit generator to said shift register over a predetermined time interval, means to periodically shift the contents of said shift register, a first code number identifying means coupled to said shift register to produce an output indicative of a first code number being therein, a counter, means to apply pulses to said counter to be counted responsive to output from said first code number identifying means, a plurality of closed gates, a different one of said gates coupling a different one of said channels to the remainder of said system, normally inoperative means to apply a different count output of said counter to open a different one of said gates, a second code number identifying means coupled to said shift register to provide a second output indicative of a second code number being therein, means to stop the application of pulses to said counter by said means to apply pulses responsive to said second output, a random pulse generator, and means responsive to the occurrence of the end of said predetermined time interval during which random digits are applied to said shift register, and to the occurrence of an output from said random pulse generator to render operative said means to apply a different count output of said counter to a different one of said gates whereby said system receives for transmission said signal from the one of said plurality of channels coupled to the gate opened by the count of said counter.

References Cited in the file of this patent

UNITED STATES PATENTS

| | | |
|---|---|---|
| 2,414,101 | Hogan et al. | Jan. 14, 1947 |
| 2,464,353 | Smith et al. | Mar. 15, 1949 |
| 2,472,774 | Mayle | June 7, 1949 |
| 2,656,407 | Herrick et al. | Oct. 20, 1953 |
| 2,697,741 | Roschke | Dec. 21, 1954 |
| 2,707,208 | Smith | Apr. 26, 1955 |
| 2,757,226 | Zworykin | July 31, 1956 |
| 2,770,803 | Ellet | Nov. 13, 1956 |